United States Patent [19]

Taylor

[11] Patent Number: 4,558,767
[45] Date of Patent: Dec. 17, 1985

[54] FLUID AMPLIFIED SHOCK ABSORBER WITH REBOUND STIFFENING CONSTRUCTION

[75] Inventor: Douglas P. Taylor, North Tonawanda, N.Y.

[73] Assignee: Tayco Developments, Inc., North Tonawanda, N.Y.

[21] Appl. No.: 463,404

[22] Filed: Feb. 3, 1983

[51] Int. Cl.[4] .................................................. F16F 9/50
[52] U.S. Cl. ............................................ 188/282; 92/9;
138/31; 188/317; 188/322.22
[58] Field of Search ............... 188/306, 308, 268, 288,
188/313, 316, 317, 320, 322.18, 322.22, 280,
281, 282; 138/40, 43, 46, 42, 31; 92/9;
137/513.3, 528

[56] References Cited

U.S. PATENT DOCUMENTS

| 1,918,699 | 7/1933 | Gruss | 188/317 X |
|---|---|---|---|
| 2,717,058 | 9/1955 | Brundrett | 188/320 |
| 2,776,035 | 1/1957 | Hebel | 188/317 |
| 3,698,521 | 10/1972 | Taylor | 188/306 |
| 3,722,640 | 3/1973 | Taylor | 188/316 |
| 3,726,368 | 4/1973 | Taylor | 188/316 |
| 3,819,060 | 6/1974 | Kendall et al. | 188/268 |
| 4,064,977 | 12/1977 | Taylor | 188/317 |

FOREIGN PATENT DOCUMENTS

| 3041549 | 5/1981 | Fed. Rep. of Germany | 188/268 |
|---|---|---|---|
| 1395379 | 3/1965 | France | 188/268 |
| 2099544 | 12/1982 | United Kingdom | 188/280 |

Primary Examiner—Bruce H. Stoner, Jr.
Assistant Examiner—Robert J. Oberleitner
Attorney, Agent, or Firm—Joseph P. Gastel

[57] ABSTRACT

A shock absorber having a casing and a piston with a piston head mounted thereon and located in a chamber within the casing containing fluid, an annular peripheral groove on the shock absorber head for mounting an annular turbulence inducing member having an L-shaped cross section which is slidable on the bottom surface of the groove from a passive position which it occupies when the piston head forces liquid from one side thereof to the other in a fluid amplification mode and which moves to an active position for creating turbulence within the groove during the rebound movement of the piston head.

6 Claims, 5 Drawing Figures

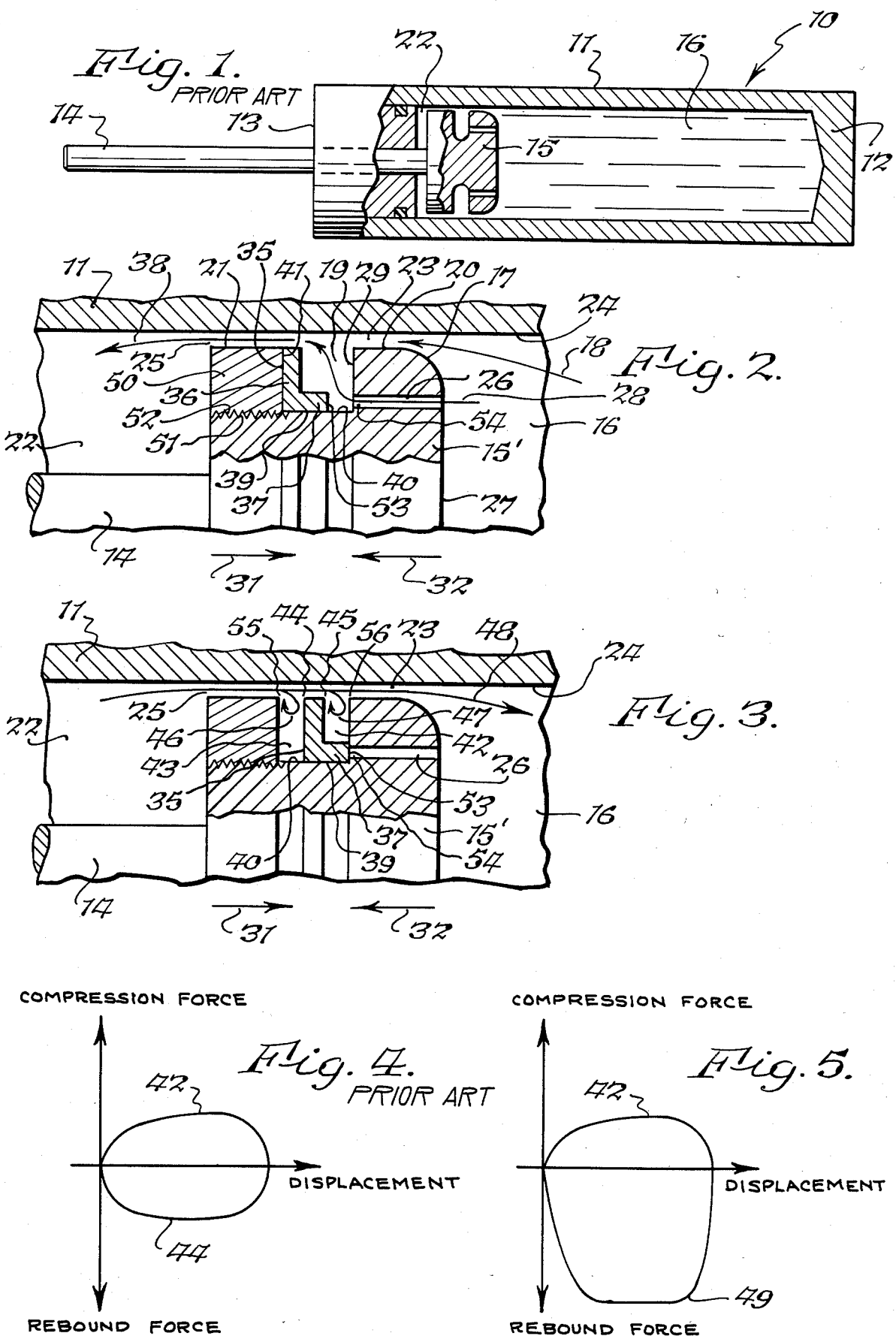

FLUID AMPLIFIED SHOCK ABSORBER WITH REBOUND STIFFENING CONSTRUCTION

BACKGROUND OF THE INVENTION

The present invention relates to a shock absorber which utilizes fluid amplification to provide a smooth compression stroke and which is modified to provide a stiff rebound.

In U.S. Pat. No. 3,726,368 there is disclosed a shock absorber with a shock absorber piston head which provides fluid amplification which gives an extremely smooth compression stroke. However, under certain circumstances, it is desired to obtain a relatively stiff rebound stroke, as in shock absorbers used on automotive vehicles.

SUMMARY OF THE INVENTION

It is the object of this invention to provide a shock absorber with a fluid amplified piston head which has been modified in an extremely simple manner to provide a stiff rebound stroke. Other objects and attendant advantages of the present invention will readily be perceived hereafter.

The present invention relates to a shock absorber having a casing, compressible fluid in said casing, a piston rod, a piston head on said piston rod located in said casing for dividing said casing into a first chamber on one side of said piston head and a second chamber on the opposite side of said piston head, fluid amplification means on said piston head for amplifying fluid flow around said piston head from said first chamber to said second chamber as said piston head moves toward said first chamber, turbulence inducing means, and mounting means mounting said turbulence inducing means in a passive position on said piston head as said piston head moves toward said first chamber, said mounting means permitting said turbulence inducing means to move to an active turbulence inducing position as said piston head moves toward said second chamber.

The various aspects of the present invention will be more fully understood when the following portions of the specification are read in conjunction with the accompanying drawings wherein:

BRIEF DESCRIPTION OF THE DRAWINGS

FIG. 1 is a side elevational view, partly in cross section, of a prior art type of fluid amplified shock absorber;

FIG. 2 is an enlarged fragmentary side elevational view, partly in cross section, of the piston head of the shock absorber mounted within the casing with the turbulence inducing member of the present invention in a passive position;

FIG. 3 is a view similar to FIG. 2 but showing the turbulence inducing member in an active position to stiffen the rebound;

FIG. 4 is a graph showing the force-displacement curve for a prior art type of shock absorber of the type shown in FIG. 1; and FIG. 5 is a force displacement curve for the improved shock absorber of FIGS. 2 and 3.

DESCRIPTION OF THE PREFERRED EMBODIMENTS

A prior art type of fluid amplified shock absorber 10 is shown in FIG. 1 and it includes a casing 11 having an end wall 12 at one end and an end wall 13 at the opposite end through which piston rod 14 extends in sealed relationship. A piston head 15 is mounted on piston rod 14. The chambers 16 and 22 on opposite sides of piston head 15 are filled with a suitable compressible liquid, such as a silicone liquid of the type used in liquid springs. The device of FIG. 1 can be a shock absorber or a liquid spring depending on the parameters thereof. The device can also be a liquid spring shock which is a combination of a liquid spring and shock absorber and which will act as a liquid spring in that the operating fluid is compressed by the piston rod, thus yielding a spring output while at the same time orificing occurs which adds a damping force which is superimposed on the spring force. A device of this type is described in detail in U.S. Pat. No. 3,726,368, which is incorporated herein by reference.

The present invention relates to an improved piston head construction 15' for a fluidic amplified shock absorber of the type shown in FIG. 1. The present invention is usable with a fluid amplified shock absorber or fluid amplified liquid spring, or a combination of both, each of which utilizes a compressible fluid, and the designation shock absorber, as used hereafter is intended to cover all of the foregoing.

The improved head 15' includes an outer annular peripheral surface 17 which is divided by groove 19 into annular peripheral surface 20 on the side of head 15' adjacent to chamber 16 and annular peripheral surface 21 on the side of head 15' adjacent to chamber 22. There is an annular clearance or space 23 between peripheral surface 17 and internal surface 24 of casing 11, and there is also an annular clearance 25 between peripheral surface 21 and the annular internal surface 24 of casing 11. A plurality of bores 26 are circumferentially placed in the portion of piston head 15' to the right of groove 19 and bores 26 extend between the leading surface 27 of the piston head and side 29 of groove 19.

During movement of piston head 15' in the direction of arrow 31 so that the piston head is forced into chamber 16, there will be a primary flow of fluid through space 23, as depicted by arrow 18, and this will induce a secondary flow of fluid through bores 26, as depicted by arrow 28. The combined primary and secondary flows, as depicted by arrow 38, will then pass through space 25 so that the fluid will enter chamber 22. The minimum cross sectional area of annular space 25 is less than the sum of the minimum cross sectional areas of annular space 23 and the sum of the areas of the cross sections of the plurality of annularly spaced bores 26. Thus there is a compression of the fluid as it passes through annular space 25. The compression force as piston 15' moves into chamber 16 is depicted by curve 42 in FIG. 4. Curve 44 depicts the rebound of the piston head when it moves in the direction of arrow 32 back toward chamber 22. Thus, from FIG. 4 it can be seen that both the compression force and the rebound force are substantially the same.

In accordance with the present invention a turbulence inducing member is mounted in groove 19. Member 35 is of annular configuration and is of L-shape in cross section. It has a vertical leg 36 and a horizontal leg 37. The horizontal leg 37 has a surface 39 which slides on the bottom annular surface 40 of groove 19. When piston head 15' is moving in the direction of arrow 31 in FIG. 2, the turbulence inducing member 35 will assume a position shown in FIG. 2 with leg 36 in abutting relationship with groove side 41. Thus, the turbulence inducing member is in a passive position during this condition of operation wherein it does not affect fluid amplified flow.

However, when piston head 15' moves in the direction of arrow 32 during rebound, the force of liquid flowing in the direction of arrow 31 through space 25 will cause turbulence inducing member 35 to move from the passive position of FIG. 2 to the active position of FIG. 3 because of the sliding connection between surfaces 39 and 40. The vertical leg 36 of member 35 will thus divide groove 19 into two grooves 42 and 43. The sharp edges 44, 45, 55 and 56 will create turbulence as schematically depicted by lines 46 and 47, respectively, to thereby retard the unamplified liquid flow depicted by arrow 48 passing through annular spaces 25 and 23. This in turn will provide a greater rebound resistance force as indicated by line 49 of the graph of FIG. 5, whereas the amplified flow curve 42 is identical to that shown in FIG. 4. The practical significance of the foregoing is that the shock absorption is relatively smooth and soft when the piston head 15' is moving in the direction of arrow 31, but there is an extremely stiff rebound resistance force when piston head 15' is moving in the direction of arrow 32. When piston head 15' moves in the direction of arrow 31 after rebound, member 35 will again assume the position of FIG. 2.

As can be seen from FIGS. 2 and 3, annular portion 50 of piston head 15' has threads 51 thereon which are received on threads 52 of the piston head. Annular portion 50 is installed after annular turbulence inducing member 35 has been mounted on the piston head with its surface 39 in sliding relationship to surface 40. It will be appreciated that turbulence inducing member 35 may be installed in any number of different ways, as by joining two halves into a groove, if the threaded connection 51-52 is not used. Furthermore, while member 35 is shown as sliding, it will be appreciated that it can be pivotably mounted so that vertical leg 36 assumes a position such as shown in FIG. 2 or it can pivot to a position where it divides groove 19 into two grooves such as shown in FIG. 3. In the latter event, the sliding connection would have to be eliminated.

In the particular embodiment shown, the leading face 53 of horizontal leg or base 37 moves into overlying relationship with the ends 54 of the plurality of annular bores 26 to thereby further restrict flow of liquid through bores 26. However, this overlying relationship does not constitute the primary reason for obtaining the rebound curve 49 of FIG. 5, as it is the induced turbulence which provides this action.

While preferred embodiments of the present invention have been disclosed, it will be appreciated that the present invention is not limited thereto but may be otherwise embodied within the scope of the following claims.

What is claimed is:

1. A shock absorber having a casing, compressible fluid in said casing, a piston rod, a piston head on said piston rod located in said casing for dividing said casing into a first chamber on one side of said piston head and a second chamber on the opposite side of said piston head, fluid amplification means on said piston head for producing fluid amplified flow around said piston head from said first chamber to said second chamber through a clearance between said piston head and said casing as said piston head moves toward said first chamber, an annular groove in said piston head dividing said piston head into a plurality of parts of substantially equal diameter, first opposite sides on said annular groove, first outer edge portions of said first opposite sides of said annular groove, turbulence inducing means in said annular groove, said turbulence inducing means comprising an annular member in said annular groove, second opposite sides on said annular member facing said first opposite sides, each of said second opposite sides terminating at a second outer edge portion on said annular member, and mounting means mounting said annular member in a passive position proximate the first side of said annular groove closest to said second chamber wherein it permits fluid amplified flow as said piston head moves toward said first chamber, said mounting means permitting said annular member to move to an active turbulence inducing position wherein it divides said annular groove into a plurality of annular grooves to retard flow from said second chamber to said first chamber as said piston head moves toward said second chamber by causing said first and second outer edge portions to create turbulence as said compressible fluid flows through said clearance space from said second chamber toward said first chamber, and means for retaining said annular member in said active turbulence inducing position as said piston head moves toward said second chamber.

2. A shock absorber as set forth in claim 1 including a plurality of annular bores in said piston head for conducting flow of fluid as said piston head moves toward said first chamber, and means for blocking said bores when said turbulence inducing means is in said active position.

3. In a shock absorber having a casing with an internal surface, a body of compressible fluid in said casing, a piston rod, and a piston head on said piston rod and located in said casing for dividing the casing into a first chamber on one side of said piston head and a second chamber on the opposite side of said piston head, a peripheral surface on said piston head in contiguous relationship to said internal surface, a groove in said peripheral surface dividing said peripheral surface into a first peripheral surface on the side of said piston head adjacent to said first chamber and a second peripheral surface on the side of said piston head adjacent said second chamber, said first and second peripheral surfaces being of substantially the same diameter, a bottom in said groove, a first side in said groove extending from said first peripheral surface to said bottom, a second side in said groove extending from said second peripheral surface to said bottom, first outer edge portions on said first and second sides, a first space between said first peripheral surface and said internal surface, fluid passage means in said piston head effecting communication between said first chamber and said groove, and a second space between said second peripheral surface and said internal surface, the improvement comprising turbulence inducing means comprising an annular member having first and second sides and second outer edge portions on said first and second sides, said annular member being located in said groove in a passive first position with its first side proximate said second side of said groove when fluid flow is through said first space and said fluid passage means when said piston head moves in a direction toward said first chamber, and mounting means for mounting said annular member in said groove for movement away from said second side to an active second position intermediate said first and second sides of said groove, and means for maintaining said annular member in said intermediate position when said piston head moves in a direction toward second chamber to effectively maintain said groove divided into a plurality of grooves to effect turbulence of fluid moving through said second space toward said first chamber when said piston head moves in a direction toward said second chamber by causing said first and second outer edge portions to create turbulence as said compressible fluid flows through said first and second spaces as it flows from said second chamber to said first chamber.

4. In a shock absorber as set forth in claim 3 including obstructing means on said turbulence inducing means for obstructing said fluid passage means when said turbulence inducing means is in said second position.

5. In a shock absorber as set forth in claim 3 wherein said mounting means comprises a base on said turbulence inducing means, and a slidable connection between said base and said bottom of said groove.

6. In a shock absorber as set forth in claim 5 wherein said turbulence inducing means comprises an L-shaped member including an upstanding leg and wherein said base comprises a horizontal leg of said L-shaped member.

* * * * *

UNITED STATES PATENT AND TRADEMARK OFFICE
CERTIFICATE OF CORRECTION

PATENT NO. : 4,558,767
DATED : December 17, 1985
INVENTOR(S) : Douglas P. Taylor It is certified that error appears in the above-identified patent and that said Letters Patent are hereby corrected as shown below:

Column 3, line 65 (claim 1), after "clearance" insert --space--.
Column 4, line 2 (claim 1), change "of" (first occurrence) to --on--.

Signed and Sealed this

Twenty-fifth Day of February 1986

[SEAL]

Attest:

DONALD J. QUIGG

Attesting Officer

Commissioner of Patents and Trademarks